(12) United States Patent
Olague et al.

(10) Patent No.: US 8,756,625 B2
(45) Date of Patent: Jun. 17, 2014

(54) SYSTEMS AND METHODS FOR DETERMINING SUBSCRIPTION DATA

(75) Inventors: Craig Alan Olague, Moorpark, CA (US); Kuan Hidalgo Archer, Los Angeles, CA (US); Christopher Strader, Valencia, CA (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 13/568,744

(22) Filed: Aug. 7, 2012

(65) Prior Publication Data

US 2012/0304219 A1 Nov. 29, 2012

Related U.S. Application Data

(63) Continuation of application No. 12/641,765, filed on Dec. 18, 2009, now Pat. No. 8,266,648, which is a continuation of application No. 11/788,726, filed on Apr. 20, 2007, now abandoned.

(51) Int. Cl.
| | |
|---|---|
| *H04N 7/16* | (2011.01) |
| *G06F 3/00* | (2006.01) |
| *G06F 13/00* | (2006.01) |
| *H04N 5/445* | (2011.01) |
| *H04N 21/41* | (2011.01) |
| *H04N 21/433* | (2011.01) |

(52) U.S. Cl.
CPC ........... *H04N 21/41* (2013.01); *H04N 21/4332* (2013.01)
USPC ................................. 725/25; 725/27; 725/39

(58) Field of Classification Search
None
See application file for complete search history.

(56) References Cited

U.S. PATENT DOCUMENTS

| | | | |
|---|---|---|---|
| 5,959,688 | A | 9/1999 | Schein et al. |
| 6,239,794 | B1 | 5/2001 | Yuen et al. |
| 6,388,714 | B1 | 5/2002 | Schein et al. |
| 6,564,378 | B1 | 5/2003 | Satterfield et al. |
| 6,684,400 | B1 * | 1/2004 | Goode et al. ..................... 725/61 |
| 6,756,997 | B1 | 6/2004 | Ward, III et al. |
| 7,165,098 | B1 | 1/2007 | Boyer et al. |
| 2002/0042915 | A1 | 4/2002 | Kubischta et al. |
| 2002/0053082 | A1 | 5/2002 | Weaver et al. |
| 2002/0174430 | A1 | 11/2002 | Ellis et al. |
| 2003/0009757 | A1 | 1/2003 | Kikinis |
| 2003/0030751 | A1 | 2/2003 | Lupulescu et al. |
| 2003/0110499 | A1 | 6/2003 | Knudson et al. |
| 2003/0149988 | A1 | 8/2003 | Ellis et al. |
| 2004/0002987 | A1 | 1/2004 | Clancy et al. |
| 2004/0128686 | A1 | 7/2004 | Boyer et al. |

(Continued)

*Primary Examiner* — Oschta Montoya
(74) *Attorney, Agent, or Firm* — Ropes & Gray LLP

(57) ABSTRACT

A media guidance application is provided by which users can view program listings associated with programming that the user may access using other user equipment devices. The media guidance application, implemented on, for example, a remote system, may determine through communications with television equipment whether or not the television equipment is authorized to provide a particular package of television programming to be viewed by the user. For example, an online program guide application may determine whether or not television equipment allows a user to view particular channels and, based on that determination, proceed to determine what packages of programming the user subscribes to. A customized program guide may then be displayed based on what programming the user subscribes to on various systems.

22 Claims, 11 Drawing Sheets

(56) References Cited

U.S. PATENT DOCUMENTS

| | | | |
|---|---|---|---|
| 2004/0172647 A1* | 9/2004 | Godwin | 725/36 |
| 2005/0028208 A1* | 2/2005 | Ellis et al. | 725/58 |
| 2005/0138657 A1 | 6/2005 | Leftwich | |
| 2005/0251827 A1 | 11/2005 | Ellis et al. | |
| 2006/0294553 A1 | 12/2006 | Walter et al. | |
| 2007/0124602 A1 | 5/2007 | Wald et al. | |
| 2008/0163304 A1* | 7/2008 | Ellis | 725/50 |
| 2008/0184302 A1* | 7/2008 | Knudson et al. | 725/40 |

\* cited by examiner

SYSTEMS AND METHODS FOR DETERMINING SUBSCRIPTION DATA

CROSS-REFERENCE TO RELATED APPLICATIONS

This application is a continuation of U.S. patent application Ser. No. 12/641,765 filed Dec. 18, 2009 (currently pending); which is a continuation of U.S. patent application Ser. No. 11/788,726 filed on Apr. 20, 2007 (now abandoned), all of which is hereby incorporated by reference herein in its entirety.

BACKGROUND OF THE INVENTION

This invention relates to interactive media guidance applications, and more particularly, to interactive media guidance applications that can connect to and access data from a multitude of user devices.

A number of media delivery systems are currently used to provide programs and program information to users. (As referenced herein, the terms "program," "programs," and "programming" include any and all types of media that a media guidance application may access, such as broadcast programs, recorded programs, movies, video clips, Videos On Demand (VOD), pay-per-view (PPV) movies, music videos, satellite radio broadcasts, HD radio broadcasts, data available via the Internet, images, icons, clipart, advertisements and promotional information.)

In addition to traditional television equipment (e.g., television, headend system, cable set-top box, etc.), a number of recent innovations now allow mobile equipment (e.g., cellular telephones, cellular network equipment, etc.) and online equipment (e.g., computers, Internet servers, etc.) to deliver programs and program information to users. In addition, commonly assigned U.S. patent application Ser. No. 09/332, 244, filed Jun. 11, 1999 teaches, among other things, using online equipment to watch and record television programs and is hereby incorporated herein in its entirety. A number of technical problems, however, follow in the wake of these innovations.

Today, users can personalize online program guidance applications by entering personal information, such as zip code, cable provider, etc. In addition, online program guidance applications have been recently implemented that are linked to television equipment in the user's home (e.g., a TiVo box). When the user is away from home, the user can use the online program guidance application to select a program for recording by the user's in-home television equipment. In response to the user selection, the program is recorded by the user's television equipment—only, however, if the user's television equipment is authorized to grant the user access to the selected program.

Programming is often subdivided into packages of programming, which are provided to users on a subscription basis. For example, a basic broadcast television package may only include local channels and a premium broadcast television package may include the basic package as well as one or more premium package channel tiers (e.g., NFL Sunday Ticket, HBO, Showtime, etc.). NFL Sunday Ticket is a service mark owned by the National Football League, HBO is a trademark owned by Home Box Office, Inc. and Showtime is a trademark owned by Showtime Networks, Inc. If the user, for example, wants to record a program that is only available on a premium channel, but the user does not subscribe to the premium package of programming that includes that channel, then that program will not be recorded. Previously known systems provide no warning when the user uses an online program guide to select a program for recording that the user does not have access to.

Systems, methods and computer readable media are desired that allow a media guidance application, implemented on a first system, to determine what programming the user has access to on one or more other systems. It also would be desirable to have systems, methods and computer readable media, which may be implemented remotely from the user's television equipment (such as online and mobile program guide systems), that can determine and inform the user whether or not the user's television equipment allows the user to access a program or package of programming.

SUMMARY OF THE INVENTION

In accordance with the principles of the present invention, a remote media guidance application is provided that may determine whether or not one or more target devices are authorized to provide a particular package of programming to be viewed by a user. The remote media guidance application is preferably an interactive media guidance application that is located remotely and operates independently from a target device. The target device may be, for example, a television set-top box, a mobile telephone, or a computer. The preferred embodiment of the present invention includes means for linking the remote media guidance application to television equipment. An online program guidance application and a mobile program guidance application are two examples of remote media guidance applications, when the target device is television equipment. In other embodiments, the target device may be user computer equipment and the remote media guidance application may be a television program guidance application or mobile program guidance application.

A target media guidance application may be implemented on the target device. For example, a television program guidance application may be implemented on user television equipment. The target device and/or target media guidance application can provide means for presenting programming to the user as well as means for presenting media guidance to the user. The systems of the present invention may also provide means for a user to subscribe to programming, packages of programming, and premium services.

Means for generating, storing and utilizing subscription data may also be utilized by some embodiments of the present invention. Subscription data summarizes which packages of programming and premium services a target device may be authorized to provide user access to. The remote media guidance application may request and receive subscription data from, for example, the target device (e.g., television equipment). The remote media guidance application may also have means for processing and utilizing the subscription data to determine whether or not the target device is authorized to provide a particular package of programming (e.g., television programming) to be viewed by a user.

In some embodiments, subscription data that is used by the target device cannot be easily transferred to the remote media guidance application. In some of these embodiments, the remote media guidance application may include means for receiving subscription data from, for example, a source device. A source device may be any device that provides programming and/or program information to the target device and/or remote media guidance application. In yet other embodiments, the remote media guidance application may include means for generating the subscription data and/or receiving subscription data that is generated by a target media guidance application (e.g., television program guidance application) in response to a request from the remote media guidance application.

Some embodiments of the present invention may include means for using channel data to generate the subscription data. Channel data summarizes which channels of programming a particular target device allows the user to access. Channel data may be generated automatically or manually. In the present invention, means for automatically generating channel data may include, for example, means for determining what channels are associated with a package of programming, instructing the target device to tune to one or more of the channels associated with the package of programming, tuning to each of those channels, and receiving an indication as to whether or not each of those channels are viewable by the user. To manually generate channel data, the present invention may include means for prompting the user as to whether or not the user can view one or more channels, and receiving a response to the inquiry from the user. The remote media guidance application may then receive subscription data from the target device. In some embodiments, the remote media guidance application generates the channel data and/or the subscription data based on inputs it receives from a user, the target device, and/a source device.

Once the present invention determines which packages of programming and premium services can be accessed by a user using the target device, the remote media guidance application may provide means for generating program guide data. The program guide data may be used to display, for example, a program guide that includes listings of programs based on what the user has access to. The program guide may also include an advertisement for programming associated with a particular package or premium service depending on whether or not the user has access to that package or service. In addition, the program guide may omit or indicate that one or more channels are associated with packages of programming and premium services that the user cannot access. The present invention may also include means for identifying that a fault exists, which is causing the particular package of programming or premium service to be not assessable.

SUMMARY OF THE FIGURES

The above and other features of the present invention, its nature and various advantages will be more apparent upon consideration of the following detailed description, taken in conjunction with the accompanying drawings in which.

DETAILED DESCRIPTION OF THE PREFERRED EMBODIMENTS

Figure 1:
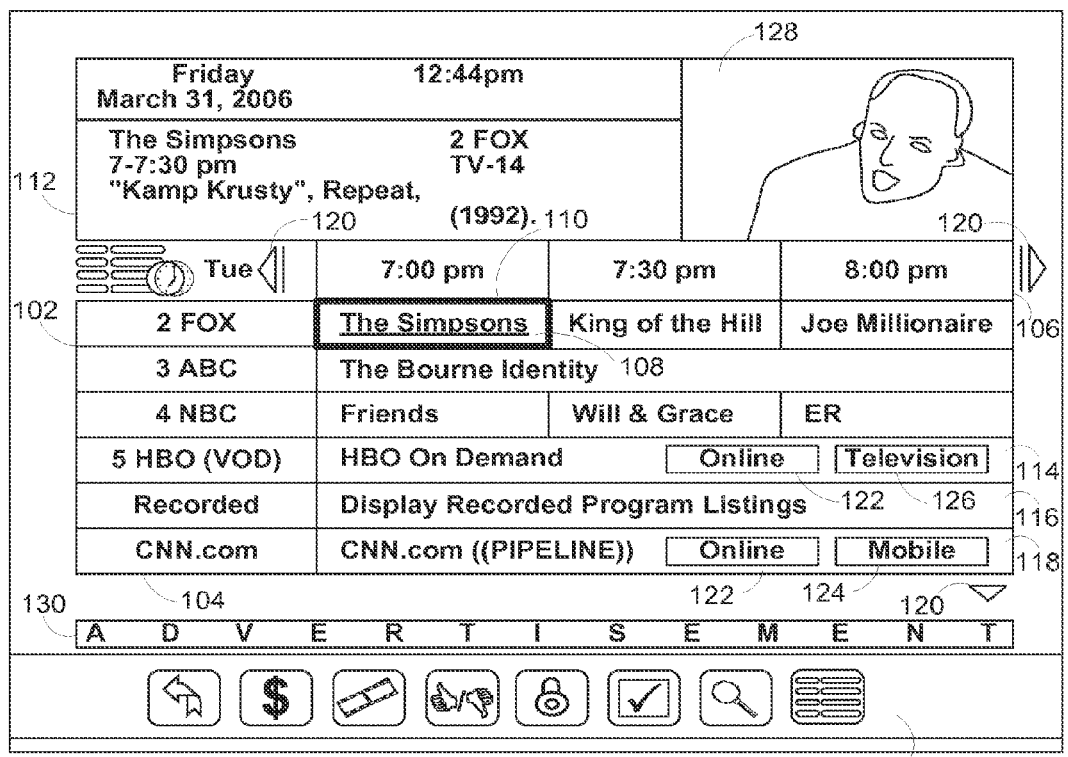
FIG. 1 shows an illustrative grid program listings display screen in accordance with one embodiment of the present invention.

The amount of media available to users in any given media delivery system can be substantial. Consequently, many users desire a form of media guidance through an interface that allows users to efficiently navigate media selections and easily identify media that they may desire. Applications that provide such guidance are generally referred to herein as media guidance applications.

A remote media guidance application, as referred to herein, is a media guidance application that is implemented on a remote device. Remote devices are discussed further below in connection with FIG. 6. The remote media guidance application allows users to efficiently navigate media selections and identify media that the user may access on at least one target device. Target devices are discussed further below in connection with FIG. 6. A media guidance application, referred to herein as a target media guidance application, may be implemented on the target device. In some embodiments, the target media guidance application may link to and communicate with the remote media guidance application which is discussed further below in connection with FIG. 7.

The remote media guidance application may be used to, for example, determine whether or not particular packages of programming and premium services can be viewed by a user with various target media systems. Media guidance applications (both remote and target) may take various forms depending on the media and/or type of system for which they provide guidance.

One typical type of media guidance application, which may act as the remote media guidance application and/or the target media guidance application, is a television program guidance application. Television program guidance applications (sometimes referred to as electronic program guides or interactive television program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Media guidance applications also allow users to navigate among and locate content related to programming content including, for example, video clips, articles, advertisements, chat sessions, games, etc.

With the advent of the Internet, mobile computing, and high-speed wireless networks, users are accessing media on personal computers (PCs) and mobile devices on which they traditionally did not. Mobile devices as referred to herein include, for example, hand-held computers, personal digital assistants (PDAs), mobile telephones, or other mobile devices.

Users are sometimes able to navigate among and locate media available to them, using their television, PC and mobile device. Consequently, media guidance is necessary on each of these devices, as well. The media guidance applications may be provided as on-line applications (i.e., provided on a website), or as stand-alone applications or clients on hand-held computers, PDAs, mobile telephones, or other mobile devices. As mentioned above, media guidance applications may act as either a remote media guidance application and/or target media guidance application. The various devices and platforms that may implement media guidance applications and how these devices and platforms interact with each other are described in more detail below.

One of the functions of the remote media guidance application is to provide media listings and media information to users. In some embodiments of the present invention, the remote media guidance application communicates with one or more target devices or applications to provide media listings and media information to users about the content the user may access using the target devices. FIGS. 1-5 show illustrative display screens that may be used by a remote media guidance application to provide media guidance, and in particular media listings. In addition to media listings, display screens of FIGS. 1 and 2 may also include, for example, an advertisement for television programming that may be associated with a particular premium service or package of programming as well as icons that associate particular program listings with content that the user may access with one or more target devices. The display screens of FIGS. 1 and 2 may also omit one or more channels that are associated with particular programs and/or packages of programming that the user does not subscribe to or cannot otherwise access with a target system.

The display screens shown in FIGS. 1-5 may be presented by any suitable device or platform that is remote from the target device. While the displays of FIGS. 1-5 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control, remote device (such as a cellular telephone, PDA, etc.), or other user input interface or device. In response to the user's indication, the remote media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access in a single display to different types of media content, which the user may access with one or more target devices. Display 100 may be presented to the user after the remote media guidance application determines what packages of programming and/or premium services the user may access with one or more target devices. Different systems and methods for determining what packages of programming and/or premium services the user may access with one or more target devices are discussed below in connection with FIGS. 3-16.

Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the remote media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. In some embodiments, the mixed-media display may include listings for programs that the user may access on different target devices. The various permutations of the types of listings that may be displayed that are different than display 100 may be based on user selections or guidance application definitions (e.g., a display of only recorded and broadcast listings, only on-demand and broadcast listings, only listings of programs that may be accessed by one or more user equipment devices, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Grid 102 may also be customized to indicate which content a particular user may access on one or more target systems. For example, when grid 102 is generated by an online program guidance application, grid 102 may be customized to indicate content that the user's television equipment, online equipment, mobile equipment, and/or any other equipment allows the user to access.

In some embodiments, icons may be used to indicate which target systems are authorized to provide the user access to one or more programs. For example, the remote program guidance application may generate grid 102, which includes icons 122, 124 and 126. In the preferred embodiment, icons 122, 124 and 126 are associated with listings which correspond to programs that the user can view with one or more target systems. For example, icon 122 is associated with listings 114 and 118. Icon 122 indicates to the user that the user's online equipment is authorized to provide the user access to the programs associated with listings 114 and 118. As another example, icon 124 indicates that the user's mobile equipment is authorized to provide the user access to the content associated with listing 118. Similarly, icon 126 indicates that the user's television equipment is authorized to provide the program associated with listing 114 to the user. Icons 122, 124 and 126, like any other icon discussed herein, may be any suitable graphical image, text or symbol. Systems and methods for determining which content the user may access on one or more target systems are discussed further in connection with FIGS. 3-9.

The remote program guidance application may or may not associate an icon with each program that a target device (such as the user's television, online or mobile equipment device) is authorized to allow the user to view. In the preferred embodiment, a program guidance application only associates icons 122, 124 and 126 with listings that are made available to the user by a target device. In some embodiments, the remote media guidance application may include an icon in grid 102 that is associated with the remote device (which is the same device that the remote media guidance application is implemented on). For example, the remote media guidance application may be a television program guidance application, implemented on user television equipment, that associates icon 126 with listings that both the user television equipment and a target device (e.g., the user's computer) is authorized to present to the user.

In some embodiments, listings that are not associated with any of icons 122, 124 or 126 are understood to be available to the user by the remote device, which is presenting display 100. For example, when the television program guidance application presents display 100, the content associated with every listing, except for listing 118, can be accessed using television equipment.

In other embodiments, listings that are not associated with any of icons 122, 124 or 126 are understood to be available to the user with a particular target device. The user may know what the particular target device is based on the type of program listings (e.g., television program listings may be understood to be available with the user's television equipment, websites may be understood to be available with the user's computer equipment, etc.) or the user-entered information discussed below. For example, when an online program guidance application presents display 100 after the user instructs the online program guidance application to link to the user's television equipment, it is understood that the content associated with every listing, except for listing 118, can be viewed using the user's television equipment.

Display 100 may also include video region 128, advertisement 130, and options region 132. Video region 128 may allow the user to view and/or preview programs that are currently available, will be available, or were available to the user. The content of video region 128 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 130 may provide an advertisement for media content that, depending on a viewer's access rights (for, e.g., packages of programming, premium services, etc.) associated with one or more target devices, is currently available for viewing, will be available for viewing in the future, or may never become available for viewing, and may correspond to or be unrelated to one or more of the media listings in grid 102 (such as, e.g., advertisements for programming the user does not have access to on the remote device and/or target device). Advertisement 130 may also be for products or services related or unrelated to the media content displayed in grid 102. Advertisement 130 may be selectable and provide further information about media content, provide information about a product or a service, enable purchasing of media content, a product, or a service, provide media content relating to the advertisement, etc. Advertisement 130 may be targeted based on a user's profile/preferences, monitored user activity, the type of display provided, or on other suitable targeted advertisement bases. Targeting advertisements is discussed further below in connection with FIG. 8.

While advertisement 130 is shown as rectangular or banner shaped, advertisements may be provided in any suitable size, shape, and location in a remote guidance application display. For example, advertisement 130 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 132 may allow the user to access different types of media content, media guidance application displays, and/or media guidance application features. Options region 132 may be part of display 100 (and other display screens of the present invention), or may be invoked by a user by selecting an on-screen option or pressing a dedicated or assignable button on a user input device. The selectable options within options region 132 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, display options (that allow the user to choose particular target devices), subscription options (that allow the user to subscribe to a premium service or package of programming), or other options.

The remote media guidance application may be personalized based on a user's preferences. A personalized remote media guidance application allows a user to customize displays and features to create a personalized "experience" with the remote media guidance application. This personalized experience may be created by allowing a user to input these customizations and/or by the remote media guidance application monitoring user activity to determine various user preferences. Users may access their personalized remote media guidance application by logging in or otherwise identifying themselves to the remote media guidance application. Customization of the remote media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, listings of programs available to the user by target devices, etc.), desired recording features (e.g., recording or series recordings for particular users, recording quality, etc.), parental control settings, and other desired customizations.

The remote media guidance application may allow a user to provide user profile information or may automatically compile user profile information. The remote media guidance application may, for example, monitor the media the user accesses and/or other interactions the user may have with the remote media guidance application. For example, the remote media guidance application may associate the identifying information of one or more target devices with a user profile. (Identifying information of target devices is discussed further below in connection with FIG. 3.) Additionally, the remote media guidance application may obtain all or part of other user profiles that are related to a particular user (e.g., from other web sites on the Internet the user accesses, such as www.tvguide.com, from target media guidance applications the user accesses, from other media guidance applications the user accesses, from a target device of the user, from other user devices of the user, etc.), and/or obtain information about the user from other sources that the media guidance application may access. As a result, a user can be provided with a unified guidance application experience across the user's different devices. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Figure 2:
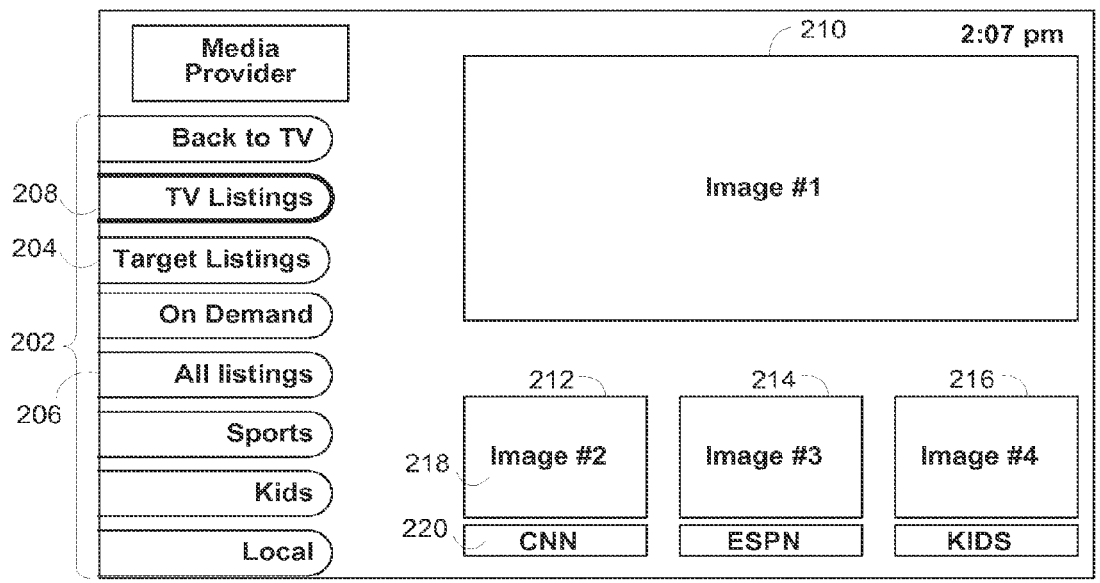
FIG. 2 shows an illustrative video mosaic program listings display screen in accordance with one embodiment of the present invention.

Video mosaic display 200, which is another display arrangement for providing media guidance, is shown in FIG. 2. Display 200 may be presented by a remote media guidance application that is, for example, a television program guidance application.

Video mosaic display 200 includes selectable options 202 for media content information organized based on media type, genre, and/or other organization criteria. Selectable options 202 may include listings options 204, 206 and 208. Listings option 202 may allow the user to view listings associated with programs that the user may access with one or more target devices. In some embodiments, the remote media guidance application may ask the user to identify the target device prior to displaying listings associated with the target device (which is discussed further below in connection with FIGS. 3 and 8). Listings option 206 may allow the user to access all the listings associated with programs that a user may access on all devices (e.g., both target and remote devices). Listings option 208 may allow the user to access listings only associated with programs that the user may access with the remote device, such as, e.g., user television equipment or personal computer.

In response to a user selecting one of the listings options included in selectable options 202, the remote media guidance application may provide listings 210, 212, 214, and 216. Similar to the listings included in grid 102 of FIG. 1, listings 210, 212, 214 and 216 may be associated with any type of program. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 212 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 210 is larger than listings 212, 214, and 216), but if desired, all the listings may be the same size. Any or all of listings 210-216 may include icons (e.g., similar to icons 122, 124 and 126 of FIG. 1) or other information that identify which device (e.g., which target device) the user may use to access the associated program. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
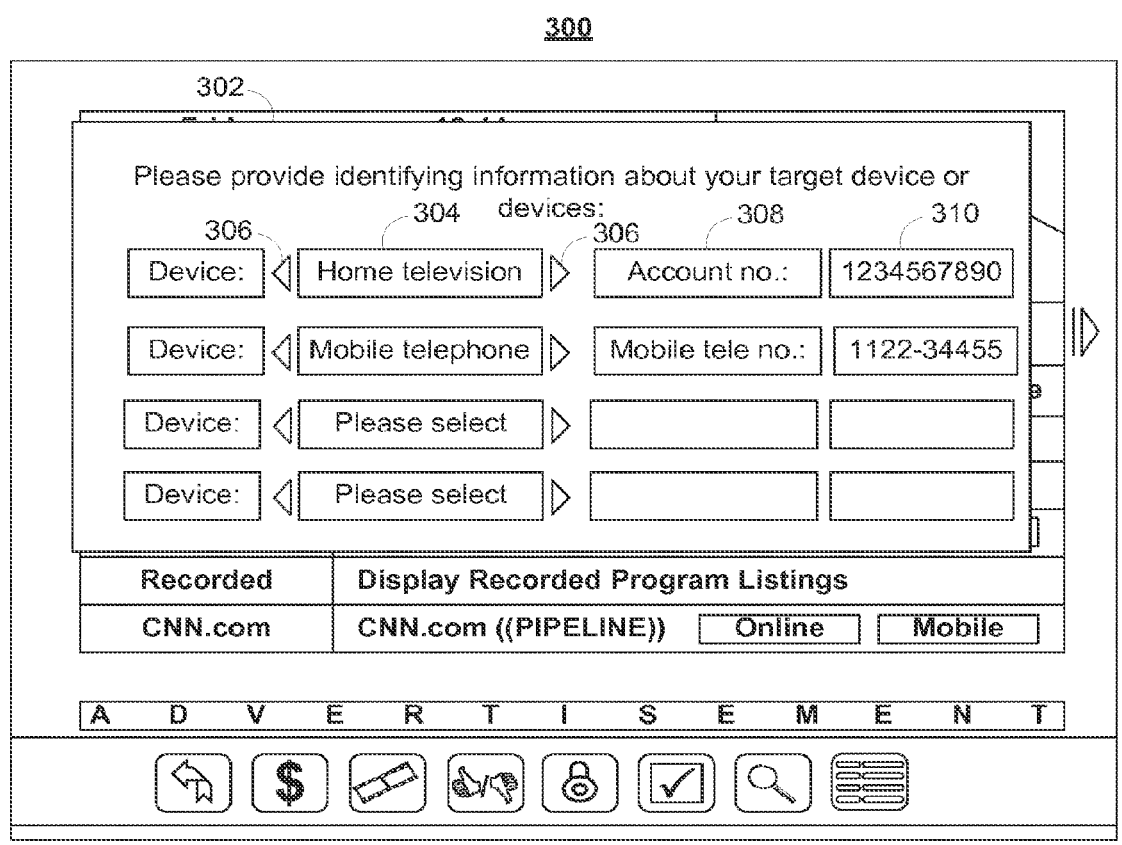
FIG. 3 shows an illustrative program guide display screen used to identify target devices.

In response to the user selecting, for example, listings option 204 of FIG. 2, the remote media guidance application may provide display 300 of FIG. 3. Display 300 may also be displayed in response to a user selecting an option in a set-up menu display (not pictured) or user-preferences menu display (not pictured).

Display 300 may include region 302, which prompts the user for identifying information about one or more target devices. The user may enter the name of the target device into field 304 or use navigational icons 306 to select a predetermined target device name.

Once the user inputs or selects the target device name, the remote media guidance application may automatically populate field 308, thereby indicating to the user what information that the remote media guidance application will need to identify the named target device. For example, when the remote media guidance application is an online guidance application, it may need an account number to link with a home television set-top box. As another example, the remote media guidance application may only need a mobile telephone number to link with a mobile device. The types of identifying data that may be used to populate field 308 (either automatically or in response to a user input) include, for example, a physical address of the target device (e.g., mailing address, zip code, etc.), network address of the target device (e.g., IP address, set-top box ID, etc.), telephone number (e.g., mobile telephone number, home telephone number, etc.), an account number, type of target device (e.g., satellite set-top box, cable set-top box, mobile telephone model no., etc.), primary content provider (e.g., cable television data source, mobile data source, satellite guidance data source, service provider, etc.), name of the target device, user-identifiable information (e.g., credit card number, personal identification number, etc.), and/or any other information or data that may allow the remote media guidance application with linking to the target device.

In some embodiments, the remote media guidance application may provide the user a number of fields 308 for each target device. In some embodiments, the user may be able to scroll through a list that is embedded in each field 308 and select the type of identifying data that the user would like to use to identify the target device named in field 304. The identifying data is then entered, either automatically by the remote media guidance application or by a user, into field 310. Region 302 may be used to name and identify multiple target devices.

As discussed below, the identifying information entered into the fields of FIG. 3 may be used to link to the target device(s) and/or other sources of data. The remote media guidance application may then receive data that the remote media guidance application can use to determine which packages of programming and/or premium services each target device is authorized to allow the user to access. (Different types of data as well as illustrative methods for determining which packages of programming and/or premium services each target device is authorized to allow the user to access are discussed further below in connection with FIGS. 8-16.)

One skilled in the art would appreciate that some embodiments of the present invention may not present display 300 to the user. For example, display 300 may not be presented when the user had provided the remote media guidance application identifying data for one or more target devices. The remote media guidance application may also automatically obtain identifying data about each target device associated with the user. For example, the remote media guidance application may use information, such as billing address, account number, telephone number, etc. that the remote media guidance application may already have access to.

Figure 4:
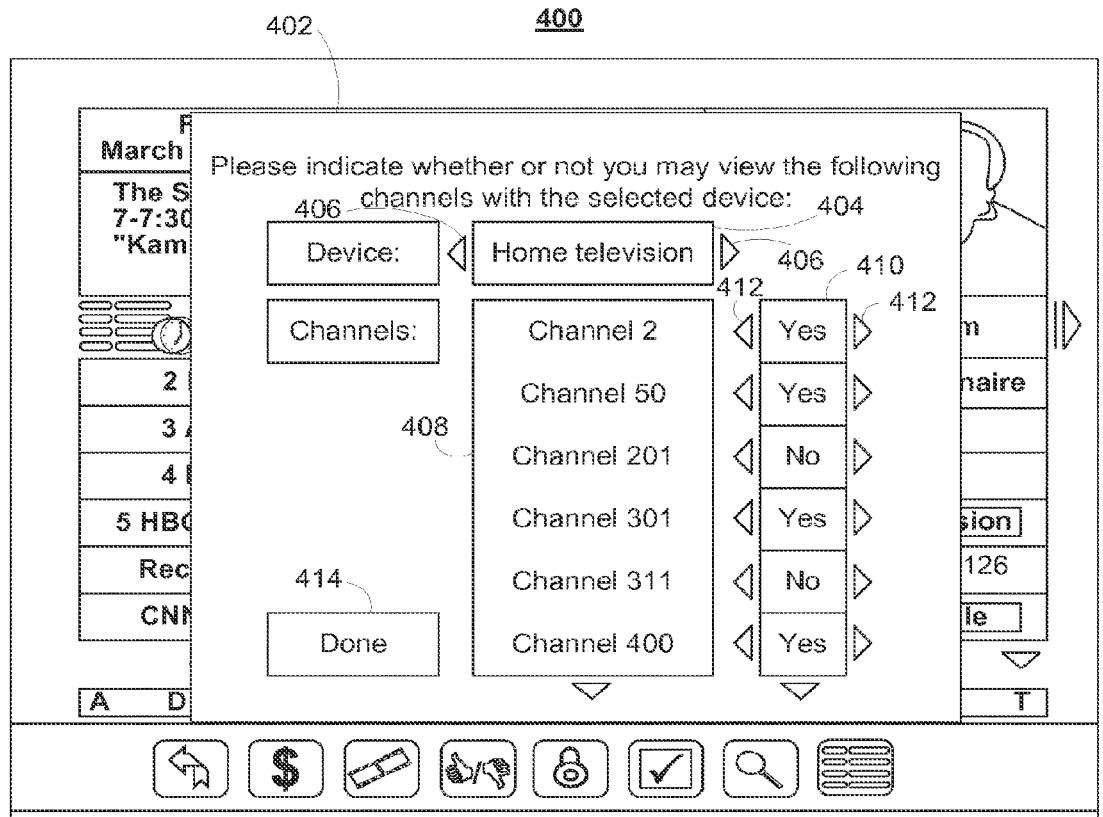
FIG. 4 shows and illustrative program guide display screen used to generate channel data.

In some embodiments, the remote media guidance application may generate display 400 shown in FIG. 4. Display 400 may include region 402 which enables the user to identify which channels the user can and cannot access with a particular target device. The remote media guidance application may then use this information to generate channel data. Channel data indicates whether or not a particular target device allows a user to view one or more particular channels of programming.

Region 402 may include field 404 and navigational icons 406. Field 404 and navigational icons 406 preferably function similar to or the same as field 304 and navigational icons 306 of FIG. 3, respectively.

Region 404 may also include channel listing 408. In the preferred embodiment, channel listing 408 includes a subset of the channels that a particular target device may be authorized to allow a user to access. (As referenced herein, the term "channel" includes a broadcast television channel, webpage, radio frequency, mobile TV channel, and any other path along which information or data may pass. Likewise, as referenced herein, "tune," "tuning" and "tuned" include any means of establishing a connection with a channel. For example, in addition to the traditional tuning of a television or radio receiver, "tuning," as used herein, also includes directing a web browser to an Internet webpage, accessing a mobile TV program, etc.) The remote media guidance application may determine which channels to include in channel listing 408 based on package data that the remote media guidance application obtains from, for example, an online database or other source of data. Package data associates packages of programming and premium services with one or more channels of programming that a particular target device may receive by a source device.

Channels listing 408 may be, for example, generated after the remote media guidance application identifies the target device as being the user's satellite television set-top box. The remote media guidance application may then request and receive programming from a particular satellite television provider. The remote media guidance application may also obtain the package data from one or more other databases that have information about the packages of programming and/or premium services provided by the satellite provider. The package data associated with the particular satellite television provider may indicate, for example, that: channel 2 is associated with the package of local channels, channel 50 is associated with the network package of programming, channel 201 is associated with the expanded network package of programming, channel 301 is associated with the HBO package of programming and the HBO VOD service, channel 311 is associated with the Showtime package of programming and VOD service, and channel 400 is associated with NFL Ticket package of programming. The channels included in channel listing 408 is largely dependent on the channel line-up of a program provider. Obtaining package data is discussed further below in connection with FIG. 11.

For each channel included in channel listing 408, the remote media guidance application may present an associated field 410 and a pair of navigational icons 412. The user may use navigational icons 412 to select whether or not the user may view the associated channel in channel listing 408. In alternative embodiments, the user may also be able to indicate that the user does not know whether or not the user may use the target device to view the associated channel. Once the user has finished indicating whether or not the user may access each of the channels included in channel listing 408, the user may select done icon 414. In response to the user selecting done icon 414, the remote media guidance application may generate channel data, which may be used to generate subscription data. Methods of using and generating channel data are discussed further below in connection with FIGS. 11-13.

Figure 5:
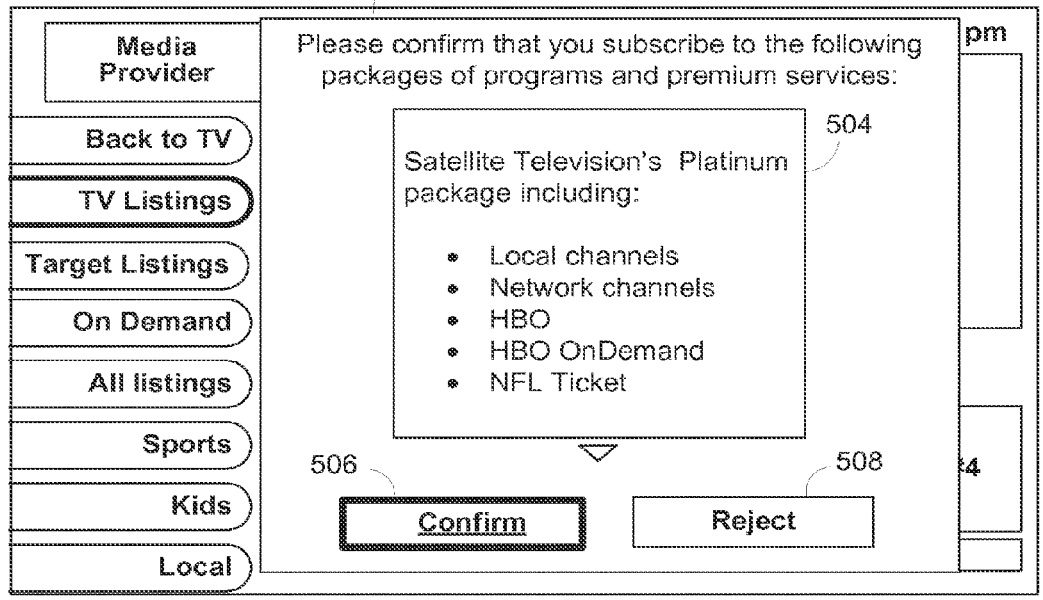
FIG. 5 shows an illustrative program guide display screen used in accordance with one embodiment of the present invention.

After the remote media guidance application has either generated or received subscription data, the remote media guidance application may present display 500 of FIG. 5. Display 500 includes region 502, which indicates to the user which packages of programming and premium services the user may access with a particular target device. For example, each package of programming and premium service, which is associated with a channel that the user may access (e.g., those channels with a "yes" in field 410), may be displayed in package summary region 504. The user may then confirm that the information displayed in package summary region 504 is correct by selecting confirm icon 506. When the user confirms that the information in package summary region 504 is correct, the remote media guidance application may then provide the user, for example, display 100 or display 200 of FIG. 1 or FIG. 2, respectively, that includes the channels associated with the packages of program and premium services presented in package summary region 504. When the user selects reject icon 508, the remote media guidance application may, for example, present to display 400 and allow the user to correct any mistakes that may have been made. In some embodiments, the remote media guidance application may present display 300 and request additional identifying information about the target device.

Figure 6:
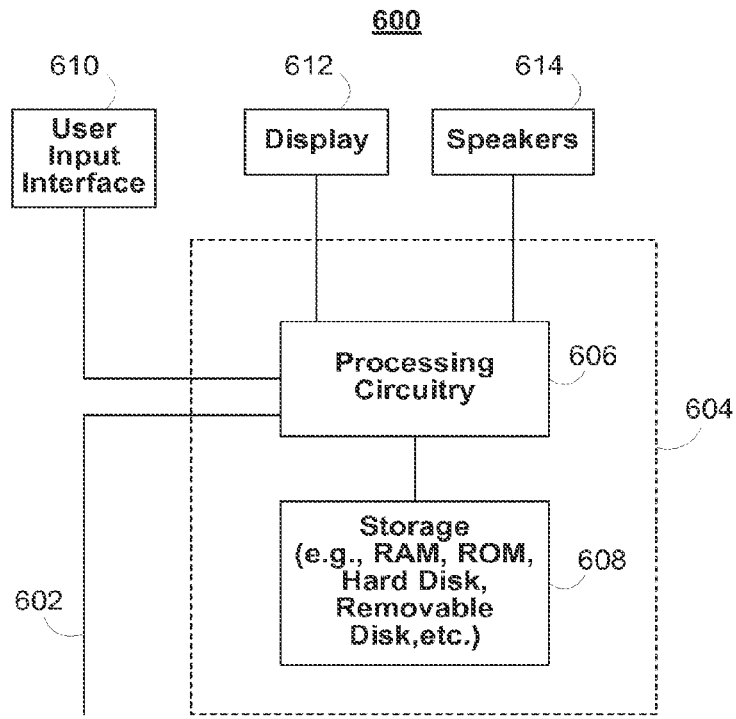
FIG. 6 shows a generalized embodiment of an illustrative user equipment device in accordance with one embodiment of the present invention.

As described above, users may access media content as well as display screens provided by the remote and target media guidance applications from one or more of their user equipment devices. FIG. 6 shows a generalized embodiment of illustrative user equipment device 600. More specific implementations of user equipment devices are discussed below in connection with FIG. 7.

User equipment device 600 may be either a remote device or target device depending on whether or not the user is using it at a particular time. As such, the user uses a remote device to access data about a target device. In other words, the remote device is a user equipment device that the user is using from a location that is remote from the target device. The target device is a user equipment device that is being targeted by the remote device.

User equipment device 600 may receive media content and data via input/output (hereinafter "I/O") path 602. I/O path 602 may provide media content (e.g., broadcast programming, on-demand programming, Internet content, and other video or audio) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry 606 such as processing circuitry based on one or more microprocessors, microcontrollers, digital signal processors, programmable logic devices, etc. In some embodiments, control circuitry 604 executes instructions for a media guidance application (which may be a remote media guidance application or target media guidance application) stored in memory (i.e., storage 608). In client-server based embodiments, control circuitry 604 may include communications circuitry suitable for communicating with a guidance application server, other networks or servers, and/or other media guidance applications. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which are described in more detail in connection with FIG. 7). In addition, communications circuitry may include circuitry that enables peer-to-peer communication of user equipment devices, such as, for example, communications between a remote device and one or more target devices (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 608 that is part of control circuitry 604. Storage 608 may include one or more of the above types of storage devices. For example, user equipment device 600 may include a hard drive for a DVR (sometimes called a personal video recorder, or PVR) and a DVD recorder as a secondary storage device. Storage 608 may be used to store various types of media described herein and guidance application data, including program information, guidance application settings, subscription data, package data, channel data, user preferences or profile information, or other data used in operating the guidance application. Nonvolatile memory may also be used (e.g., to launch a boot-up routine and other instructions).

Control circuitry 604 may include video generating circuitry and tuning circuitry, such as one or more analog tuners, one or more MPEG-2 decoders or other digital decoding circuitry, high-definition (HD) tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting media into the preferred output format of the user equipment 600. Circuitry 604 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may control the control circuitry 604 using user input interface 610. User input interface 610 may be any suitable user interface, such as a remote control, mouse, trackball, keypad, keyboard, touch screen, touch pad, stylus input, joystick, voice recognition interface, or other user input interfaces. Display 612 may be provided as a stand-alone device or integrated with other elements of user equipment device 600. Display 612 may be one or more of a monitor, a television, a liquid crystal display (LCD) for a mobile device, or any other suitable equipment for displaying visual images. In some embodiments, Display 612 may be HDTV-capable. Speakers 614 may be provided as integrated with other elements of user equipment device 600 or may be stand-alone units. The audio component of videos and other media content displayed on Display 612 may be played through Speakers 614. In some embodiments, the audio may be distributed to a receiver (not shown), which processes and outputs the audio via Speakers 614.

Figure 7:
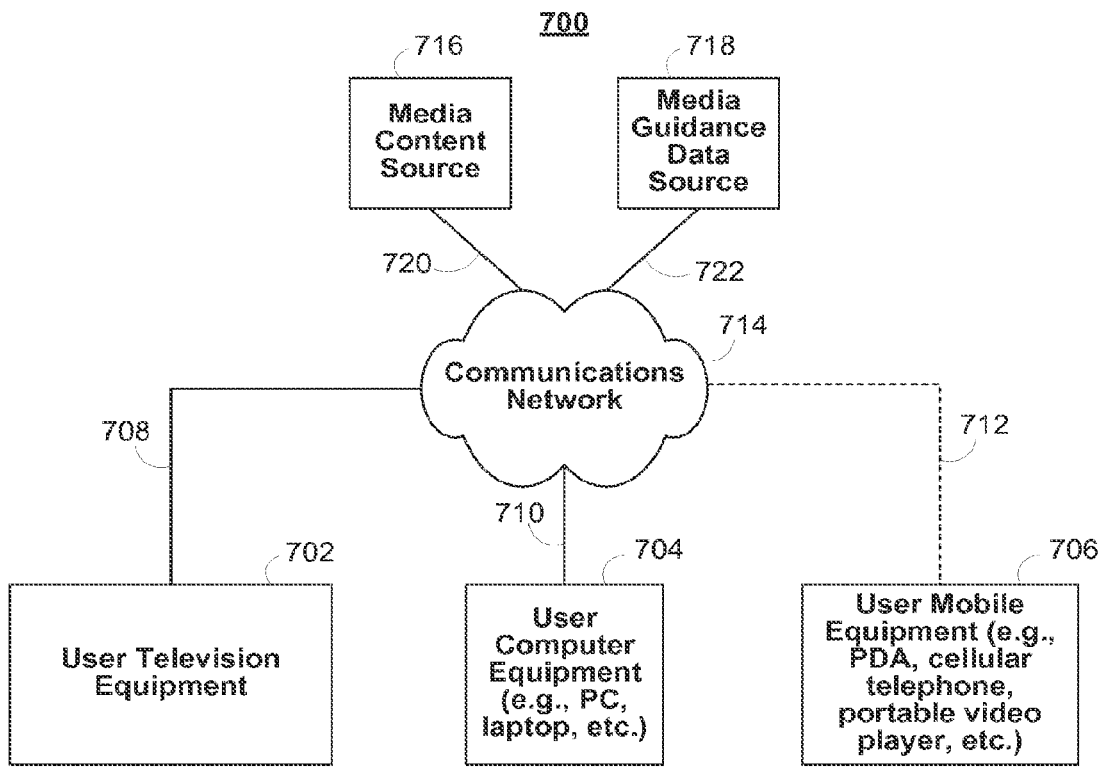
FIG. 7 shows a generalized embodiment of an illustrative interactive media guidance system in accordance with one embodiment of the present invention.

User equipment device 600 of FIG. 6 can be implemented in system 700 of FIG. 7 as user television equipment 702, user computer equipment 704, user mobile equipment 706, or any other type of user equipment suitable for accessing media, such as a non-portable gaming machine. As such, each of user television equipment 702, user computer equipment 704, and user mobile equipment 706 may be either a remote or target device, depending on whether or not the user is using the user equipment device or targeting the user equipment device. For simplicity, these devices may be referred to herein collectively as user equipment or user equipment devices. User equipment devices, on which a media guidance application is implemented, may function as a standalone device or may be part of a network of devices. A media guidance application implemented on a remote device is referred to herein as a remote media guidance application. A media guidance application implemented on a target device is referred to herein as a target media guidance application. Various network configurations of devices may be implemented and are discussed in more detail below.

User television equipment 702 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 704 may include a PC, a laptop, a tablet, a WebTV box, a personal computer television (PC/TV), a PC media server, a PC media center, or other user computer equipment. WEBTV is a trademark owned by Microsoft Corp. User mobile equipment 706 may include PDAs, a mobile telephone, a portable video player, a portable music player, a portable gaming machine, or other wireless devices.

The user equipment devices may be authorized to allow the user to access different media on a subscription basis. For example, the user may pay a subscription fee, which may be an amount of money, and in return a user equipment device (e.g., set-top box, cellular telephone, etc.) is authorized to allow the user to access one or more premium services (e.g., VOD services, digital cable, HD programming services, additional program guide features, etc.) and/or packages of programming (e.g., basic programming, premium programming, HBO programming, SHO programming, etc.). The authorization may come from a media content source (e.g., headend, online media store, etc.) and/or a media guidance data source, both of which are discussed further below. The subscription fee may be charged on an occurrence-by-occurrence basis (e.g., one program at a time), monthly basis, yearly basis, or any other basis. The subscription data may be integrated into the user equipment device as software or hardware. In some embodiments, the subscription data for a particular user equipment device may be obtained from a media content source and/or the media guidance data source, such as those discussed below. An illustrative embodiment of a subscription data structure is discussed further below in connection with FIG. 14.

One skilled in the art would appreciate that the user equipment devices may be premium devices that authorize the user to access one or more premium services and/or packages of programming without requiring the user to have a subscription for the programming. For example, an HD radio is a premium device that currently allows a user to access HD radio programming without a subscription.

It should be noted that with the advent of television tuner cards for PC's, WebTV, and the integration of video into other user equipment devices, the lines have become blurred when trying to classify a device as one of the above devices. In fact, each of user television equipment 702, user computer equipment 704, and user mobile equipment 706 may utilize at least some of the system features described above in connection with FIG. 6 and, as a result, include flexibility with respect to the type of media content available on the device. For example, user television equipment 702 may be Internet-enabled allowing for access to Internet content, while user computer equipment 704 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 700, there is typically more than one of each type of user equipment device but only one of each is shown in FIG. 7 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and out-of-home devices. Settings include those described above, as well as channel and program favorites, programming preferences that a media guidance application utilizes to make programming recommendations, display preferences, and other desirable guidance settings. For example, if a user sets a channel as a favorite on, for example, the web site www.tvguide.com on their personal computer at their office, the same channel may appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device and regardless of whether they are being used as a target or remote device. In addition, the changes made may be based on settings input by a user, as well as user activity monitored by the media guidance application.

The user equipment devices may be coupled to communications network 714. Namely, user television equipment 702, user computer equipment 704, and user mobile equipment 706 are coupled to communications network 714 via communications paths 708, 710, and 712, respectively. Communications network 714 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes media content source 716 and media guidance data source 718 coupled to communications network 714 via communication paths 720 and 722, respectively. Both media content source 716 and media guidance data source 718 are sometimes referred to herein as source devices. Paths 720 and 722 may include any of the communication paths described above in connection with paths 708, 710, and 712. Communications with the media content source 716 and media guidance data source 718 may be exchanged over one or more communications paths, but are shown as a single path in FIG. 7 to avoid overcomplicating the drawing. In addition, there may be more than one of each of media content source 716 and media guidance data source 718, but only one of each is shown in FIG. 7 to avoid overcomplicating the drawing. (The different types of each of these sources are discussed below.) If desired, media content source 716 and media guidance data source 718 may be integrated as one source device. Although communications between sources devices 716 and 718 with user equipment devices 702, 704, and 706 are shown as through communications network 714, in some embodiments, sources devices 716 and 718 may communicate directly with user equipment devices 702, 704, and 706 via communication paths (not shown) such as those described above in connection with paths 708, 710, and 712.

Media content source 716 may include one or more types of media distribution equipment including a television distribution facility, cable system headend, satellite distribution facility, programming sources (e.g., television broadcasters, such as NBC, ABC, HBO, etc.), online media stores (e.g. iTunes, etc.) intermediate distribution facilities and/or servers, Internet providers, on-demand media servers, and other media content providers. NBC is a trademark owned by the National Broadcasting Company, Inc., iTunes is a service mark owned by Apple Inc., ABC is a trademark owned by the ABC, Inc., and HBO is a trademark owned by the Home Box Office, Inc. Media content source 716 may be the originator of media content (e.g., a television broadcaster, a Webcast provider, etc.) or may not be the originator of media content (e.g., an on-demand media content provider, an Internet provider of video content of broadcast programs for downloading, etc.). Media content source 716 may include cable sources, satellite providers, on-demand providers, Internet providers, or other providers of media content.

Media content source 716 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

As described above, media content source 716 may provide content to user equipment devices on a subscription basis. As such, media content source 716 may store or have access to subscription data associated with each user equipment device that it provides programming to. In such embodiments, media content source 716 may use identifying data (such as the data discussed above in connection with FIG. 3) to identify each user equipment device. In other embodiments, media content source 716 provides all content to each user equipment device and each user equipment device is specifically programmed to only allow the user to access the programming that the user subscribes to.

Media guidance data source 718 may provide media guidance data, such as media listings, media-related information (e.g., broadcast times, media channels, media titles, media descriptions, ratings information (e.g., parental control ratings, critic's ratings, etc.), genre or category information, actor information, logo data for broadcasters' or providers' logos, subscription information, etc.), media format (e.g., standard definition, high definition, etc.), advertisement information (e.g., text, images, media clips, etc.), on-demand information, subscription data, package data, channel data and any other type of media guidance application data that may be used to generate program guide displays (such as those shown in FIGS. 1-5) that are helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel).

Program schedule data and other media guidance data may be provided to the user equipment on a television channel sideband, in the vertical blanking interval of a television channel, using an in-band digital signal, using an out-of-band digital signal, or by any other suitable data transmission technique. Program schedule data and other media guidance data may be provided to user equipment on multiple analog or digital television channels. Program schedule data and other media guidance data may be provided to the user equipment with any suitable frequency (e.g., continuously, daily, a user-specified period of time, a system-specified period of time, in response to a request from user equipment, etc.). In some approaches, media guidance data from media guidance data source 718 may be provided to users' equipment using a client-server approach. For example, a media guidance application client residing on the user's equipment may initiate sessions with source 718 to obtain guidance data when needed. Media guidance data source 718 may provide user equipment devices 702, 704, and 706 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 604 of user equipment device 600 and partially on a remote server as a server application (e.g., media guidance data source 718). The media guidance application displays may be generated by the media guidance data source 718 and transmitted to the user equipment devices. The media guidance data source 718 may also transmit data for storage on the user equipment, which then generates the guidance application displays based on instructions processed by control circuitry.

Media guidance system 700 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 7.

In one approach, user equipment devices, such as a remote device and a target device, may communicate with each other within a home network. User equipment devices can communicate with each other directly via short-range point-to-point communication schemes describe above, via indirect paths through a hub or other similar device provided on a home network, or via communications network 714. Each of the multiple individuals in a single home may operate different user equipment devices on the home network, however, each individual may be able to access the content the other individuals subscribe to with the different user equipment devices. As a result, it may be desirable for user equipment device ID information as well as various media guidance information, settings, and data (such as, e.g., subscription data, channel data, package data, program guide data, etc.) to be communicated between the different user equipment devices. For example, the present invention may automatically populate fields, similar to those discussed in connection with FIG. 3, with the data shared on a home network. As another example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users of remote devices, which may be located inside or outside a home, can use their remote media guidance application to communicate directly with media content source 716 to determine which media content a target device is authorized to provide to the user. For example, within a home, users of user television equipment 704 or user computer equipment 706 may access media content source 716, which may be a mobile media content source, to navigate among and locate desirable media content the user's mobile device is authorized to access. As another example, users may also access the remote media guidance application using user mobile equipment 706 and navigate among and locate desirable media content available to the user on one or more target devices, such as user television equipment 702 and/or user computer equipment 704.

In a third approach, users may have multiple types of user equipment by which they access media content and obtain media guidance. For example, some users may have home networks that are accessed by in-home devices. Users may use a remote media guidance application, which may be implemented on a remote device located inside and/or outside a user's home (e.g., laptop computer, mobile device, etc.), to control their other in-home devices (e.g., television, home computer, etc.). For example, the remote media guidance application may be an online program guidance application on a website accessed via a personal computer at their office or home. Some mobile devices are not web-enabled, but do receive mobile TV (using, for example, Verizon's VCAST premium service). VCAST is a service mark owned by Verizon Wireless Bell Atlantic Cellular Holdings, L.P., et al. As another example, the remote media guidance application may also be a mobile program guidance application that may be presented on such mobile devices. The user may set various settings (e.g., recordings, reminders, or other settings) on the online guidance application to control target equipment such as, for example, the user's in-home equipment. The remote media guidance application may control the user's equipment directly, or by communicating with a target media guidance application on the user's in-home equipment. Various systems and methods for communicating between user equipment devices, where the user equipment devices are each in different physical locations, are discussed in, for example, Ellis et al., U.S. patent application Ser. No. 10/927,814, filed Aug. 26, 2004, which is hereby incorporated by reference herein in its entirety.

Figure 8:
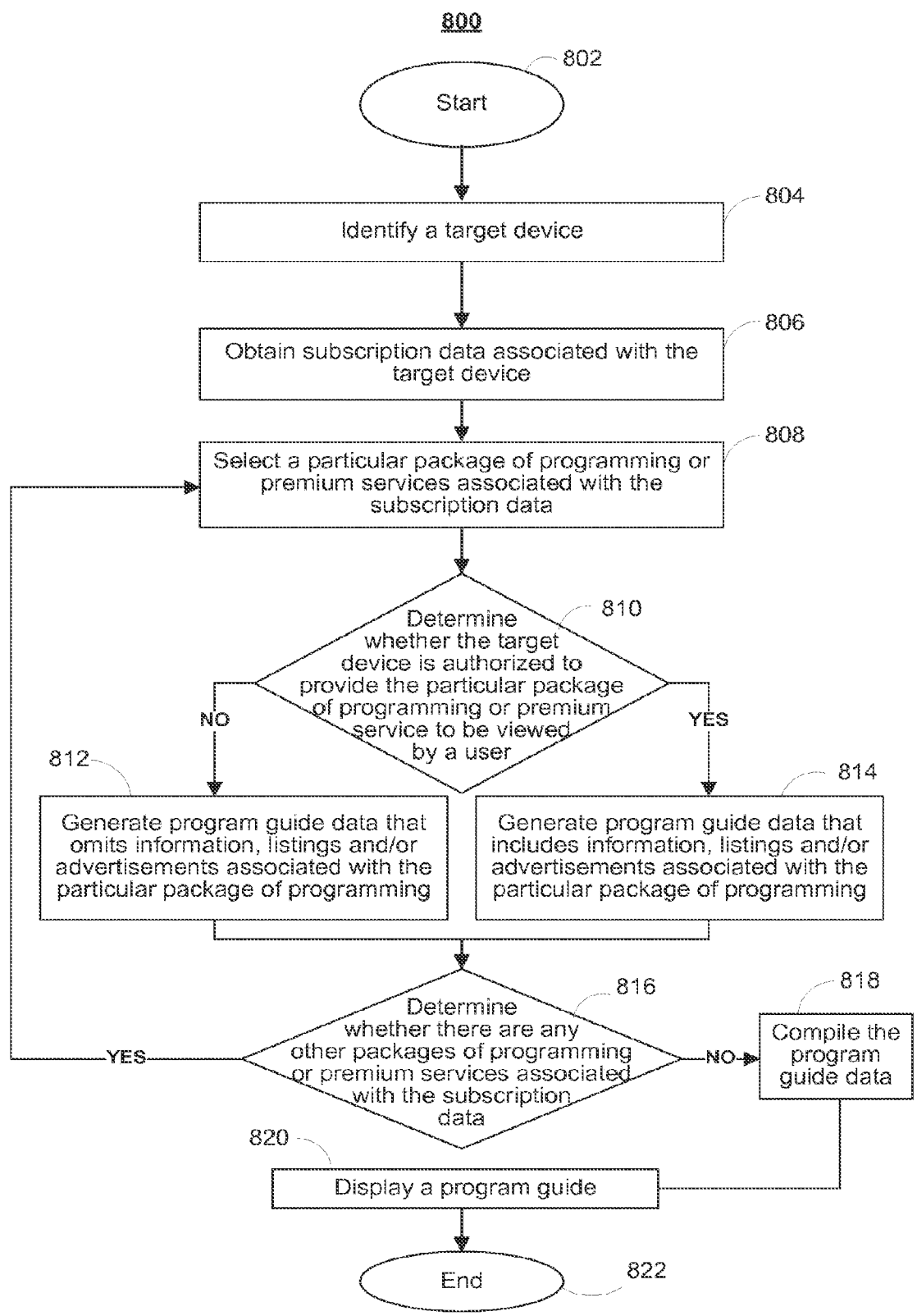
FIG. 8 is a flow diagram of an illustrative process that determines whether or not a system is authorized to provide programming to be accessed by a user.

Further to the discussion above in connection with FIGS. 1-5, methods for determining which packages of programming and/or premium services each target device is authorized to allow the user to access are discussed further below in connection with FIGS. 8-16. FIG. 8 shows process 800, which generally depicts how the preferred embodiment of the present invention determines which packages and/or premium services each target device allows a user to access prior to displaying, for example, display 100 of FIG. 1 on a remote device. In some embodiments, which are discussed in connection with FIGS. 9 and 10, the remote media guidance application may obtain subscription data from the target device or a source device that provides programming and/or program information to the target device. In other embodiments, which are discussed in connection with FIGS. 11-13, the subscription data is generated by a remote media guidance application and/or target media guidance application using, for example, package data and channel data. FIG. 14 shows an illustrative example of a subscription data structure that can be used to indicate which premium services and/or packages of programming a particular target device is authorized to allow a user to access.

Process 800 begins at step 802. In step 804, a user or remote media guidance application obtains identifying data about a target device, as discussed above in connection with FIG. 3.

In step 806 the remote media guidance application uses the identifying data from step 804 to obtain subscription data associated with the target device. Subscription data may be obtained in a number of ways. For example, the remote media guidance application may request and receive the subscription data from the target device or from a source device (which are discussed further in connection with FIGS. 9 and 10, respectively). As another example, the remote media guidance application may generate subscription data associated with the target device (which is discussed further in connection with FIGS. 11-13).

Subscription data indicates what packages of programming and premium services a target device is authorized to allow a user to access. Process 800 then proceeds to step 808 where the remote media guidance application selects a particular package of programming or premium service included in the subscription data.

The remote media guidance application analyses that portion of the subscription data and determines in step 810 whether or not the target device is authorized to provide the particular package of programming and/or premium service to a user.

When the remote media guidance application determines that the particular package of programming or premium service is not made available to the user with the target device, process 800 proceeds to step 812. In step 812 the remote media guidance application generates program guide data that omits listings, advertisements, and/or other information associated with the particular package of programming. In some alternative embodiments, advertisements for the particular package of programming or premium service may be included in the program guide data, because the particular package of programming or premium service is not associated with the subscription data. In some embodiments, rather than omitting listings and/or other information the target device is not authorized to present to the user, the remote media guidance application may present the prohibited listings and/or other information in a manner that is different than the listings and/or other information the user may access with the target device. For example, the prohibited listings may be shaded gray and/or colored red, while the authorized listings are not shaded and/or colored black.

When the remote media guidance application determines that the particular package of programming or premium service can be accessed with the target device, process 800 proceeds from step 810 to step 814. In step 814 the remote media guidance application generates program guide data that includes information, listing and/or advertisements associated with the particular package of programming and/or premium service.

In step 816, the remote media guidance application determines whether or not there are any other packages of programming or premium services, which are associated with the subscription data and have not been processed through step 810. If so, process 800 returns to step 808 and another package of programming or premium service is selected and processed through steps 808-814.

When every package of programming and premium service associated with the subscription data has been processed through step 810, process 800 proceeds to step 818. In step 818, all of the program guide data generated in steps 812 and 814 are compiled together. In step 820, the compiled program guide data is used to display a program guide similar or the same as, for example, that shown in FIG. 1, FIG. 2 or FIG. 5. Process 800 ends at step 822.

Figure 9:
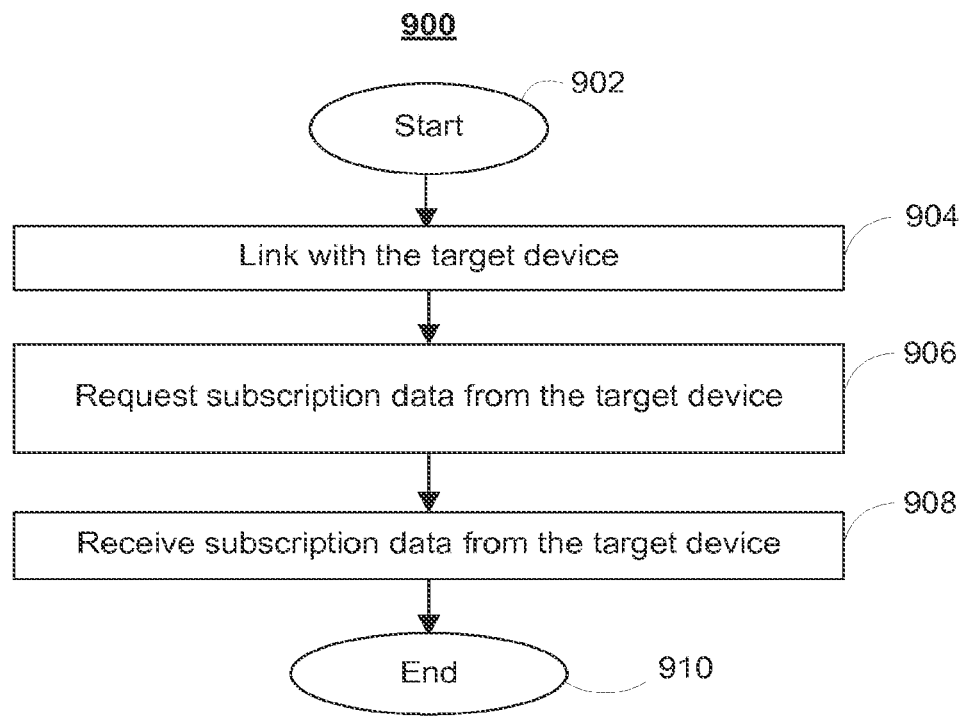
FIGS. 9-11 are flow diagrams of illustrative processes that are used to obtain subscription data.

FIG. 9 shows process 900, which is an illustrative example of how subscription data may be obtained in step 806 of process 800. Process 900 begins at step 902.

In step 904, the remote media guidance application uses the target device's identifying data, which was obtained in step 804 of process 800, to link with the target device. The remote media guidance application preferably uses a communications path, such as those discussed above in connection with FIG. 7, to link with the target device. In some embodiments, the remote media guidance application may then communicate with a target media guidance application implemented on the target device.

In step 906, the remote media guidance application requests subscription data from the target device. In response to the request, the remote media guidance application receives subscription data from the target device in step 908. The process ends at step 910.

Figure 10:
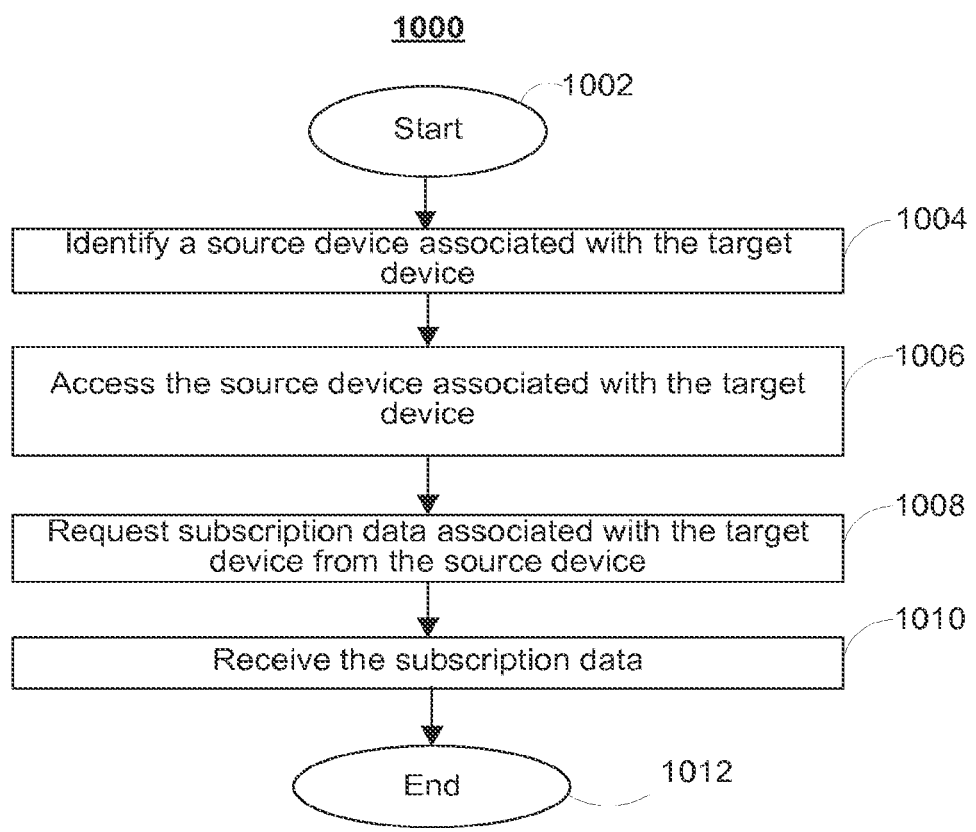

FIG. 10 shows process 1000, which is an second illustrative example of how subscription data may be obtained in step 806 of process 800. Process 1000 begins at step 1002.

In step 1004, the remote media guidance application uses the target device's identifying data, which was obtained in step 804 of process 800, to identify a source device (such as the source devices discussed above in connection with FIG. 7) that provides programming and/or programming data to the target device. In some embodiments, the remote media guidance application may require additional information to complete step 1004. In such embodiments, the remote media guidance application may prompt the user for additional identifying data about the target device, such as, for example, the target device's service provider.

In step 1006, the remote media guidance application uses the target device's identifying data, which was obtained in step 804 of process 800 (and, in some instances, the additional data obtained in step 1004), to communicate with the source device (identified in step 1004). Communications may be exchanged over a communications path, such as those discussed above in connection with FIG. 7.

In step 1008, the remote media guidance application requests subscription data associated with the target device from the source device. In response to the request, the remote media guidance application receives subscription data from the source device in step 1010. The process ends at step 1012.

Figure 11:
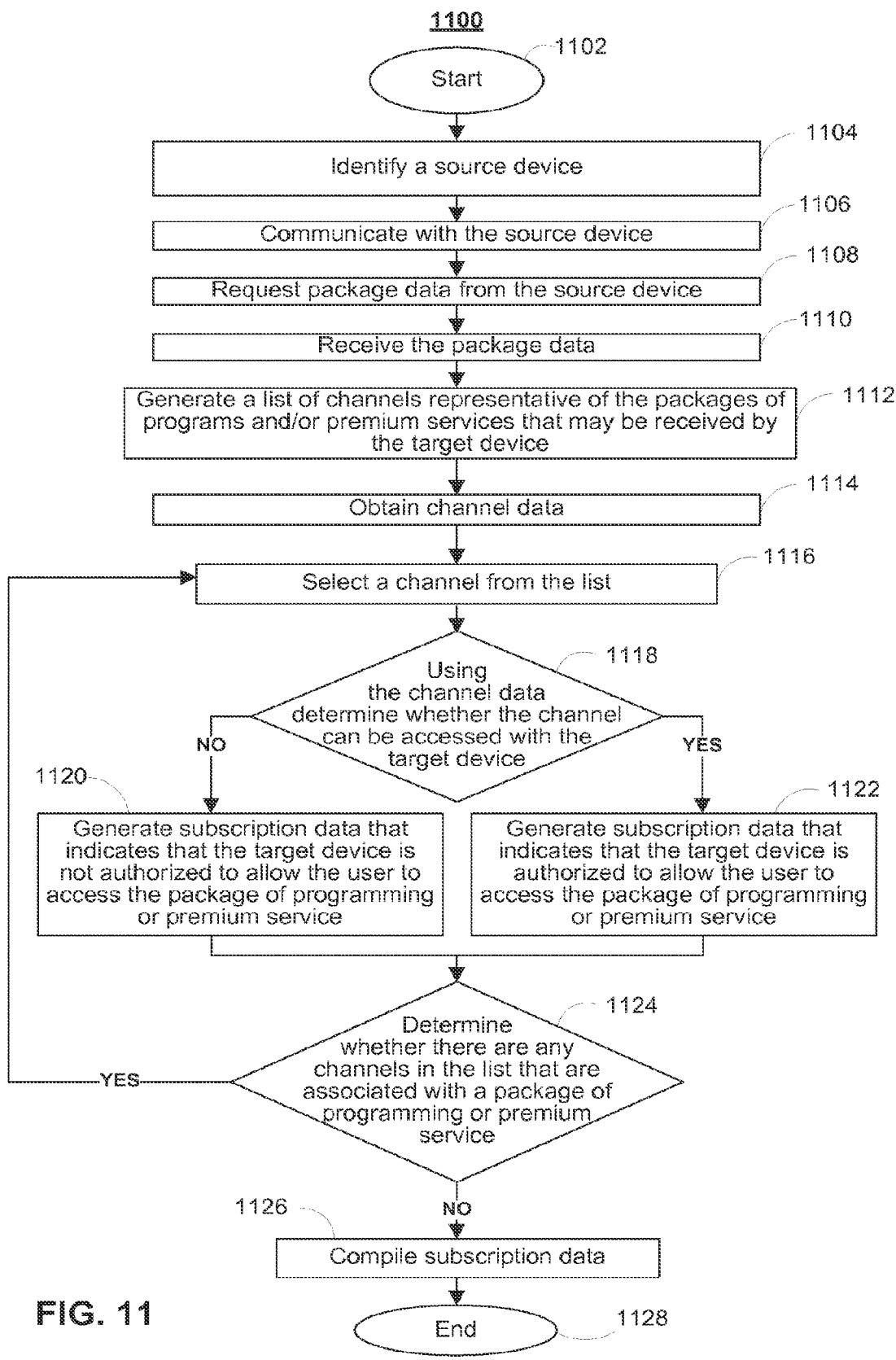

FIG. 11 shows process 1100, which is a third illustrative example of how subscription data may be obtained in step 806 of process 800. In particular, process 1100 illustrates a method for generating subscription data. Subscription data may need to be generated when, for example, the remote media guidance application is unable to receive the subscription data from the target device and/or source device, because of formatting, encryption, transmission, handshaking, and/or any other problem. Process 1100 begins at step 1102.

In step 1104, the remote media guidance application uses the target device's identifying data, which was obtained in step 804 of process 800, to identify a source device (such as the source devices discussed above in connection with FIG. 7). The source device preferably provides programming and/or programming data to the target device. In some embodiments, the source device may be, for example, a database that does not actually provide programming to a target device, but rather provides data (about, e.g., target devices and/or other source devices that provide programming or programming information to potential target devices) to remote devices. For example, the source device may be a database maintained for tvguide.com that includes channel line-ups (i.e., which channel numbers are associated with which packages of programming and premium services) for a number of television headend systems and satellite providers around the world.

In some embodiments, the remote media guidance application may require additional information to complete step 1004. In such embodiments, the remote media guidance application may prompt the user for additional identifying data about the target device, such as, for example, the target device's service provider.

In step 1106, the remote media guidance application uses the target device's identifying data, which was obtained in step 804 of process 800 (and, in some instances, the additional data obtained in step 1104), to communicate with the source device (identified in step 1104). The communications may be exchanged over a communications path, such as those discussed above in connection with FIG. 7.

In step 1108, the remote media guidance application requests package data from the source device. The remote media guidance application receives the package data in step 1110 from the source device. The package data allows the remote media guidance application to determine the channel line-up provided to the target device.

In step 1112, the remote media guidance application uses the package data to identify one or more channels that are associated with each package of programming and premium service that the target device may receive. All of the channels that are identified are compiled into a list. In the preferred embodiment, the list includes only one representative channel for each package of programming or premium service. In other embodiments, the list may include more than one channel associated with each package of programming or premium service. In some of these other embodiments, every channel in the channel line-up may be included in the list. The list of channels may then be displayed in a manner similar to or the same as the list of channels displayed in FIG. 4.

In step 1114, channel data is obtained. Channel data may be obtained by, for example, requesting and receiving the channel data from a target device and/or source device. Additional examples of how channel data may be obtained are discussed in connection with FIGS. 12 and 13.

Next is step 1116, at which the remote media guidance application selects a channel from the list that was generated in step 1112. When the list only includes one representative channel for each package of programming or premium service, the remote media guidance application selects from the list a channel that has not been selected. Similarly even when the list includes more than one channel for each package of programming or premium service, the remote media guidance application may, for example, simply select from the list a channel that has not yet been selected.

In some other embodiments, when the list may include more than one channel for each package of programming or premium service and when step 1116 is preceded by step 1124 (discussed below), the remote media guidance application may utilize additional information when selecting a channel from the list. For example, the remote media guidance application may select from the list a channel that (1) has not yet been selected and (2) is associated with a package of programming or premium service which is not currently included in the subscription data (generated in steps 1120 and 1122 below). As such, the remote media guidance application may use partially generated subscription data to deduce which packages of programming and premium services have already been analyzed. In addition, the remote media guidance application may use the package data to deduce which channels are associated with packages of programming and premium services.

For example, when step 1124 precedes step 1116, the remote media guidance application may have already selected channel 171, determined that the user has access to a particular premium sports package, and generated partial subscription data based on the determination. The remote media guidance application may then use the package data to deduce that channel 172, which is also included in the list and has not been selected, is associated with the particular premium sports package. The remote media guidance application may then deduce, for example, that the user also has access to channel 172, because channel 172 is not available ala carte and only available when the user subscribes to the particular premium sports package. As a result, the remote media guidance application will not select channel 172 from the list in step 1116. In other words, by determining (in steps 1118-1122) that the user can view channel 171, the remote media guidance application is able to determine that the user has access to the particular premium sports package, and subsequently deduce that the remote media guidance application does not need to select from the list the other channels associated with the particular premium sports package. By making these deductions, the process of the invention may be executed more efficiently and timely.

The remote media guidance application uses the channel data obtained in step 1114 to determine in step 1118 whether or not the channel can be accessed by the user with the target device. When the target device is not authorized to allow the user to access the first channel (e.g., it is blocked, unavailable, scrambled, etc.), the remote media guidance application generates subscription data in step 1120 that indicates that the target device is not authorized to allow the user to access the package of programming or premium service associated with the channel. When the target device is authorized to allow the user to access the channel, the remote media guidance application generates subscription data in step 1122 that indicates that the target device is authorized to allow the user to access the package of programming or premium service associated with the channel.

Process 1100 then proceeds to step 1124, in which the remote media guidance application determines whether or not there are any other channels in the list (that was generated at step 1112) that have not been processed through step 1116. When there is a channel in the list that still needs to be processed through step 1116, process 1100 returns to step 1116 and another channel from the list is selected. When all of the channels in the list have been processed through step 1116, process 1100 proceeds to step 1126, at which the remote media guidance application compiles the subscription data generated in steps 1120 and/or 1122. The compiled subscription data may then be used in process 800. Process 1100 ends at step 1128.

Figure 12:
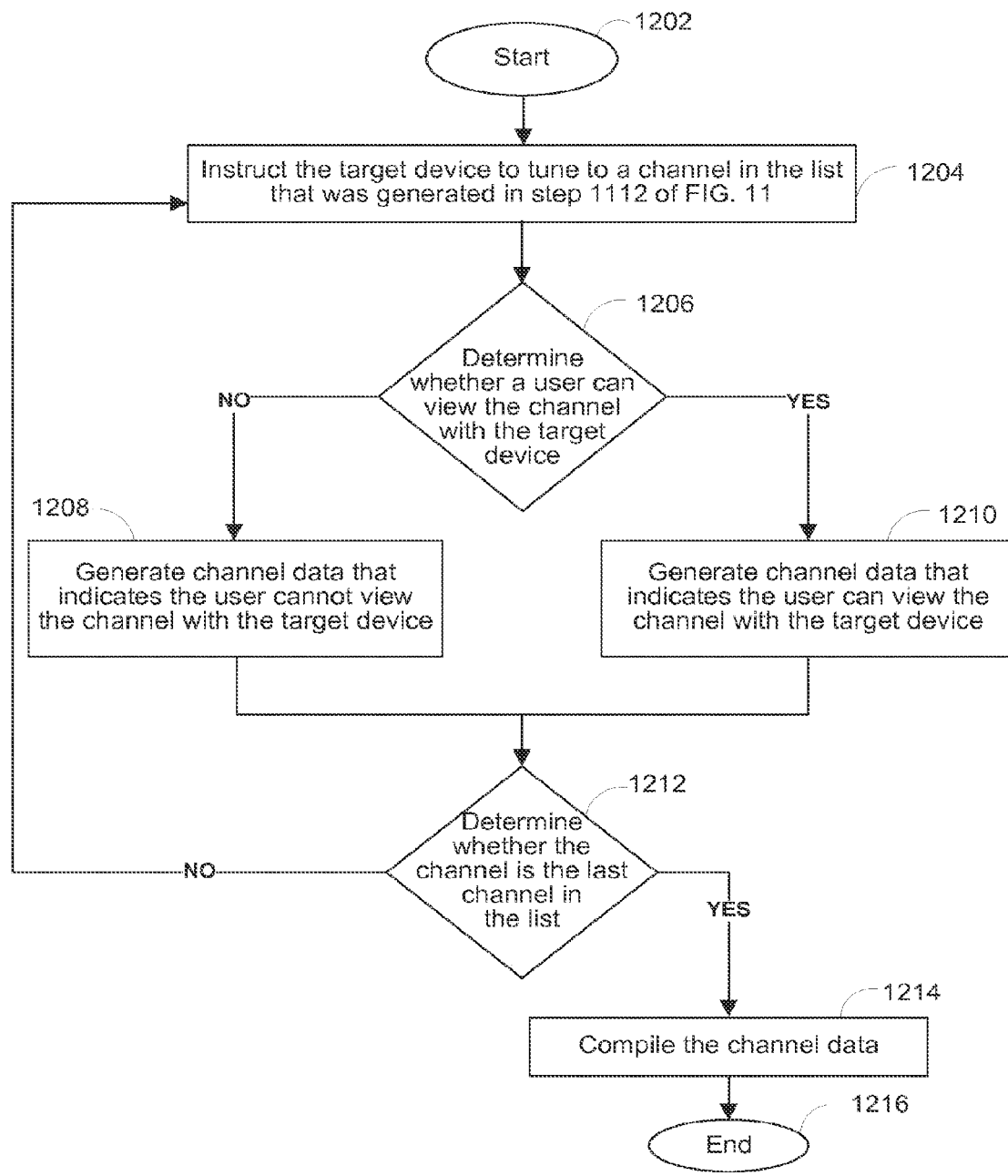
FIGS. 12-13 are flow diagrams of illustrative processes that are used to generate channel data.

FIG. 12 shows process 1200, which is an illustrative example of how channel data may be obtained in step 1114 of process 1100. Process 1200 begins at step 1202 and is preferably executed by a target media guidance application in response to the request generated in step 1108.

In step 1204, the target device is instructed to tune to the first channel in the list (which was generated in step 1112 of FIG. 11). The target media guidance application may receive the instruction to tune from, for example, the remote media guidance application or a user input interface (such as a remote control or any other input interface device discussed above in connection with FIG. 6). In some embodiments, when the target media guidance application tunes the target device, it may appear to the user that the target device is conducting an automatic scan of the entire channel line-up or a subset thereof. Systems and methods for automatically scanning a subset of channels are discussed in commonly assigned U.S. patent application Ser. No. 11/412,549, filed Apr. 27, 2006.

In the embodiments that do not automatically change the channel, a prompt may be displayed that asks the user to tune to the channel with an interface device. In other embodiments, in response to the remote media guidance application instructing the target device to tune to a channel, the target device may monitor which channels the user tunes to during the normal course of using the target device. In yet other embodiments, rather than instructing the target device to tune to a channel, the remote media guidance application may instruct the target media guidance application to monitor and record which channels the user tunes to when the target device is ON.

Next in process 1200 is step 1206, at which the target media guidance application determines whether or not a user can view the channel with the target device. The determination may be based on a user input or system input. When the user cannot view the channel with the target device, the target media guidance application generates channel data in step 1208 that indicates that the user cannot use the target device to view programming on the channel. When the user can view the channel (because, e.g., the target device descrambles the channel, the target media guidance application is able to tune to the channel, etc.), the target media guidance application generates channel data in step 1210 that indicates that the user can use the target device to view programming on the channel.

At step 1212, the target media guidance application determines whether or not the channel is the last channel in the list. When the target media guidance application determines that there are more channels in the list that have not been processed through step 1206, process 1200 returns to step 1204. When the channel is the last channel in the list, process 1200 advances to step 1214 and the channel data from steps 1208 and/or 1210 are compiled together. The compiled channel data may then be used in process 1100 of FIG. 11. Process 1200 ends at step 1216.

Figure 13:
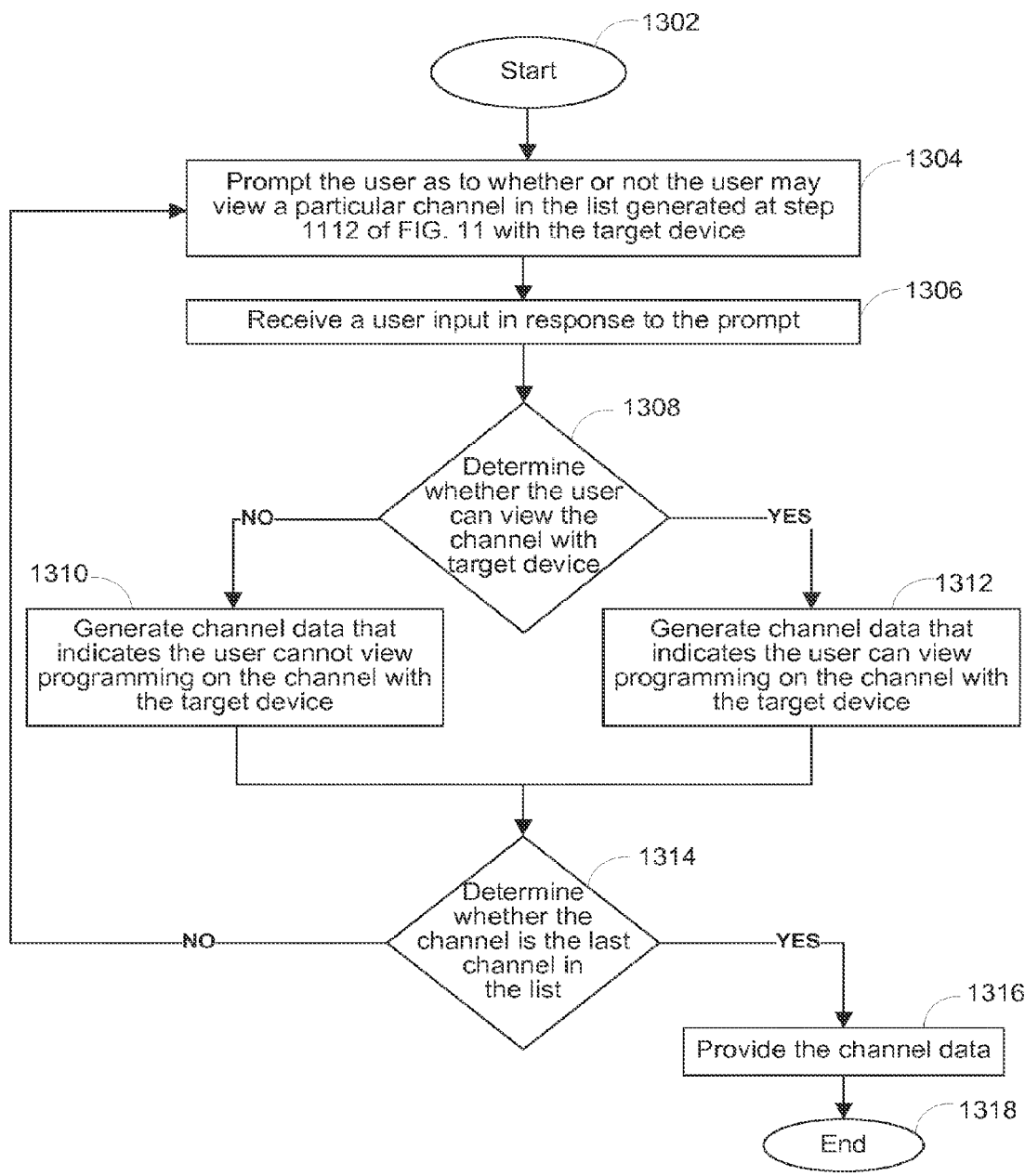
Figure 14:
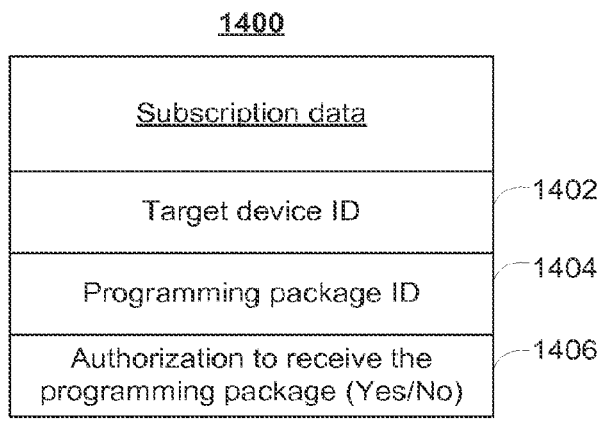
FIG. 14 shows an illustrative embodiment of subscription data structure.

FIG. 13 shows process 1300, which is a second illustrative example of how channel data may be obtained in step 1114 of process 1100. Process 1300 begins at step 1302 and is preferably executed by a remote media guidance application. In some embodiments, any or all of steps 1304-1318 may be executed by the target media guidance application.

In step 1304, the remote media guidance application prompts the user as to whether or not the user may view with the target device each of the channels in the list (which was generated at step 112 of FIG. 11). This step may be completed by, for example, providing the user a display similar to or the same as display 400 of FIG. 4.

Next in process 1300 is step 1306, at which the remote media guidance application receives a user input in response to the prompt or prompts presented to the user in step 1304.

At step 1308, the remote media guidance application uses the user input(s) to determine whether or not the user can view each channel with the target device. For each channel that the remote media guidance application determines that the user cannot view with the target device, the remote media guidance application generates channel data in step 1310 that indicates that the user cannot use the target device to view programming on the channel. When the user can view programming on the channel, the target media guidance application generates channel data in step 1312 that indicates that the user can use the target device to view programming on the channel.

In step 1314, the remote media guidance application determines whether or not the channel is the last channel in the list. When the remote media guidance application determines that there are more channels in the list that have not been processed through step 1306, process 1300 returns to step 1304. When the channel is the last channel in the list, process 1300 advances to step 1316 and the channel data from steps 1310 and/or 1312 are compiled together. Process 1300 ends at step 1316.

FIG. 14 shows an illustrative embodiment of subscription data structure 1400. Subscription data structure 1400 may include field 1402 that includes an identifier for the user equipment device or devices that are associated with the subscription data included in fields 1404 and 1406. The identifier included in field 1402 can preferably be used to locate the user equipment device that is targeted by a remote media guidance application. Field 1402, like any other field of any data structure discussed herein, may be organized in the form of a linked list, an array, a table, or any other suitable organization scheme. The user equipment identifier included in field 1402 may be, for example, one or more of a device identification number, a telephone number (land-line or mobile), an address (physical or electronic), device serial number, account number, or anything else that may be used to identify the user equipment device or devices (such as the identifying data discussed in connection with FIG. 3).

Subscription data structure 1400 may also include fields 1404 and 1406. Field 1404 may include a unique identifier for a particular package of programming or premium service that may be received by the user equipment device or devices associated with field 1402. Field 1406 preferably includes an indicator as to whether or not the user equipment device or devices identified in field 1402 are authorized to allow a user to access the package of programming or premium service identified in field 1404. For example, an account number associated with user television equipment 702 (of FIG. 7) may be included in field 1402, data identifying a premium service or package of programming may be included in field 1404, and field 1406 may indicate that user television equipment 702 is authorized to allow a user to view the premium service or package of programming.

Figure 15:
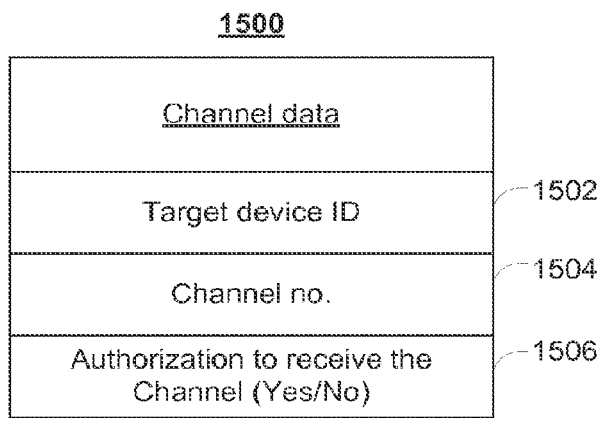
FIG. 15 shows an illustrative embodiment of channel data structure.

FIG. 15 shows an illustrative embodiment of channel data structure 1500. Channel data structure 1500 may include field 1502, which is substantially similar to or the same as field 1402 discussed above. Preferably, field 1502 includes an identifier for the user equipment device or devices that are associated with the channel data included in fields 1504 and 1506. The identifier included in field 1502 can preferably be used to populate field 1402 when subscription data structure 1400 is generated using channel data structure 1500 (as discussed in connection with FIG. 11).

Channel data structure 1500 may also include fields 1504 and 1506. Field 1504 may include a unique identifier for a particular channel that may be used to deliver programming to the user equipment device or devices associated with field 1502. Field 1506 preferably includes an indicator as to whether or not the user equipment device or device(s) included in field 1502 is authorized to allow a user to access the channel identified in field 1504. For example, a serial number associated with user television equipment 702 may be included in field 1502, data identifying the channel number 300 may be included in field 1504, and field 1506 may indicate that user television equipment 702 is authorized to allow a user to view channel number 300.

Figure 16:
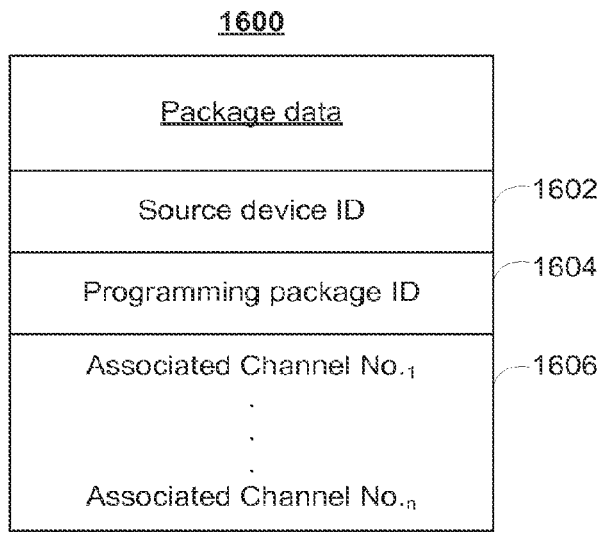
FIG. 16 shows an illustrative embodiment of package data structure.

FIG. 16 shows an illustrative embodiment of package data structure 1600. Package data structure 1600 may include field 1602, which preferably includes a unique identifier for a source device that provides programming in accordance with the package data included in fields 1604 and 1606. The identifier included in field 1602 may be used to identify, for example, the type of media content source (e.g., satellite television, broadcast television, mobile, online, etc.), the geographic location that media content source serves, etc.

Package data structure 1600 may also include fields 1604 and 1606. Field 1604 may include a unique identifier for a particular package of programming that may be delivered by the source device associated with field 1602. The identifier included in field 1604 can preferably be used to populate field 1404 when subscription data structure 1400 is generated using package data structure 1600 (as discussed in connection with FIG. 11). Field 1606 preferably includes an indicator or list of indicators that specifies which channels are associated with the package of programming identified in field 1604 as provided by the media content source identified in field 1602. For example, headend identification data associated with media content source 716 (of FIG. 7) may be included in field 1602, data identifying the premium package of programming may be included in field 1604, and field 1606 may indicate that user television equipment 702 is authorized to allow a user to view the HBO package of programming.

One skilled in the art would appreciate that there may be additional uses of the present inventions that are discussed herein without departing from the spirit of the invention. For example, subscription data may be generated using multiple approaches (using, e.g., processes 900, 1000 and 1100) to determine whether or not the target device is operating correctly and allowing the user to view all of the packages of programming and premium services the user subscribes to. When different approaches generate different subscription data for the same target device, a media guidance application may notify the user and/or appropriate system manager (of, e.g., media content source 716, media guidance data source 718, etc.) of the fault and, in some instances, provide a specific error code.

The above disclosure is meant to be exemplary and not limiting. Only the claims that follow are meant to set bounds as to what the present invention includes.

What is claimed is:

1. A method comprising:
    receiving at a target user equipment a request for subscription data from a remote media guidance application, wherein the subscription data indicates content a user is authorized to access; and
    transmitting, from target user equipment, the subscription data to the remote media guidance application in response to the request, wherein the remote media guidance application is implemented on a remote equipment, and wherein the remote media guidance application determines whether the target user equipment is authorized to receive a package of content from a remote server and generate for display the package of content to the user based on the subscription data by:

comparing each package of content of a plurality of packages of content available to the target user equipment from the remote server to the subscription data; and selecting the package of content the remote device is authorized to receive on the target user equipment in response to determining that one of the plurality of packages of content from the remote server corresponds to the subscription data.

2. The method of claim 1 further comprising using a target user equipment guidance application to generate the subscription data in response to the request, wherein the target user equipment guidance application is implemented on the target user equipment.

3. The method of claim 1, wherein the request further comprises:

instructing the target user equipment to access content associated with the package of content; and determining whether the target user equipment allows the content associated with the package of content to be viewed by the user.

4. The method of claim 1, wherein the request further comprises:

instructing the target user equipment to prompt the user to view content associated with the package of content; and instructing the target user equipment to receive a user indication as to whether the content associated with the package of content is viewable by the user; and in response to the request, generating the subscription data based on whether the content associated with the package of content is viewable by the user.

5. The method of claim 1 further comprising:

determining that the target user equipment allows the package of content to be viewed by the user; and in response to determining that the target user equipment allows the package of content to be viewed by the user, generate for display an advertisement for content associated with the package of content.

6. The method of claim 1 further comprising:

determining that the target user equipment does not allow the package of content to be viewed by the user; and in response to determining that the target user equipment does not allow the package of content to be viewed by the user, not generating for display content associated with the package of content.

7. The method of claim 1 further comprising:

determining that the target user equipment does not allow the package of content to be viewed by the user; and in response to determining that the target user equipment does not allow the package of content to be viewed by the user, generating for display additional content that is associated with the package of content that is not viewable by the user.

8. The method of claim 1 further comprising:

determining that the target user equipment does not allow the package of content to be viewed by the user; and in response to determining that target user equipment does not allow the package of content to be viewed by the user, generating for display an advertisement for content associated with the package of content.

9. The method of claim 1 further comprising:

determining that the target user equipment does not allow the package of content to be viewed by the user; and in response to determining that the target user equipment does not allow the package of content to be viewed by the user, generating for display an advertisement for the package of content.

10. The method of claim 1 further comprising:

determining that the target user equipment does not allow the package of content to be viewed by the user; and in response to determining that the target user equipment does not allow the package of content to be viewed by the user, identifying that a fault exists that is causing the package of content to be not viewable.

11. A system, comprising:

a target user equipment comprising circuitry configured to:

receive a request for subscription data from a remote media guidance application, wherein the subscription data indicates content a user is authorized to access; and transmit the subscription data to the remote media guidance application in response to the request, wherein the remote media guidance application is implemented on a remote equipment, and wherein the remote media guidance application determines whether the target user equipment is authorized to receive a package of content from a remote server and generate for display the package of content to the user based on the subscription data by:

comparing each package of content of a plurality of packages of content available to the target user equipment from the remote server to the subscription data; and selecting the package of content the target user equipment is authorized to receive in response to determining that one of the plurality of packages of content from the remote server corresponds to the subscription data.

12. The system of claim 11, wherein a target user equipment guidance application is implemented on the target user equipment, wherein the target user equipment guidance application is configured to generate the subscription data in response to the request for the subscription data from the remote media guidance application.

13. The system of claim 11, wherein to the request comprises:

instructing the target user equipment to access content associated with the package of content;

determining whether the target user equipment allows content associated with the package of content to be accessed by the user; and generating the subscription data.

14. The system of claim 11, wherein the remote media guidance application is further configured to:

instruct the target user equipment to prompt the user to view content associated the package of content;

instruct the target user equipment to receive a user indication as to whether content associated with the package of content is viewable by the user; and generate the subscription data based on whether the content associated with the package of content is viewable by the user.

15. The system of claim 11, wherein the remote media guidance application is further configured to generate for display an advertisement for content associated with the package of content, in response to determining that the target user equipment allows the package of content to be viewed by the user.

16. The system of claim 11, wherein the remote media guidance application is further configured to not generate for display content associated with the package of content, in response to determining that the target user equipment does not allow the package of content to be viewed by the user.

17. The system of claim 11, wherein the remote media guidance application is further configured to generate for display additional content that is associated with the package of content that is not viewable by the user, in response to determining that the target user equipment does not allow the package of content to be viewed by the user.

18. The system of claim 11, wherein the remote media guidance application is further configured to generate for display an advertisement for content associated with the package of content, in response to determining that the target user equipment does not allow the package of content to be viewed by the user.

19. The system of claim 11, wherein the remote media guidance application is further configured to generate for display an advertisement for the package of content, in response to determining that the target user equipment does not allow the package of content to be viewed by the user.

20. The system of claim 11, wherein the remote media guidance application is further configured to identify that a fault exists that is causing the package of content to be not viewable, in response to determining that the target user equipment does not allow the package of content to be viewed by the user.

21. A method of using a media guidance application, the method comprising:
receiving, with the media guidance application, a user request for subscription data, from a first user equipment device, wherein the media guidance application is accessible to the first user equipment device;
determining, using the media guidance application, a package of media content from a remote server that a second user equipment device is authorized to receive based on the subscription data; by comparing each package of media content of a plurality of packages of media content available to the second user equipment from the remote server to the subscription data and selecting the package of media content the user is authorized to receive on the second user equipment device in response to determining that one of the plurality of packages of media content from the remote server corresponds to the subscription data; and
generating, with the media guidance application, for display on the first user equipment content associated with the package of media content the user is authorized to receive on the second user equipment device.

22. A system, the system comprising:
a media guidance application comprising control circuitry configured to:
receive a user request for subscription data, from a first user equipment device, wherein the media guidance application is accessible to the first user equipment device;
determine a package of media content from a remote server that a second user equipment device is authorized to receive based on the subscription data; by comparing each package of media content of a plurality of packages of media content available to the second user equipment from the remote server to the subscription data and selecting the package of media content the user is authorized to receive on the second user equipment device in response to determining that one of the plurality of packages of media content from the remote server corresponds to the subscription data; and
generate for display on the first user equipment content associated with the package of media content the user is authorized to receive on the second user equipment device.

\* \* \* \* \*